United States Patent [19]

Minhas et al.

[11] Patent Number: 4,744,807

[45] Date of Patent: May 17, 1988

[54] METHOD OF MANUFACTURING A CELLULOSE ACETATE MEMBRANE AND THE MEMBRANE SO PRODUCED

[75] Inventors: Bhupender S. Minhas, Ottawa; Takeshi Matsuura, Gloucester; Srinivasa Sourirajan, Ottawa, all of Canada

[73] Assignee: Canadian Patents and Development Ltd., Ottawa, Canada

[21] Appl. No.: 887,728

[22] Filed: Jul. 21, 1986

[51] Int. Cl.$^4$ .......................... B01D 53/22; C08J 9/28; C08J 9/36
[52] U.S. Cl. ........................................ 55/158; 55/16; 264/41
[58] Field of Search ............... 264/41; 210/500.30, 210/500.31, 500.32, 500.41, 500.38; 55/158, 16

[56] References Cited

U.S. PATENT DOCUMENTS

| | | | |
|---|---|---|---|
| 3,842,515 | 10/1974 | MacDonald et al. | 34/9 |
| 3,884,801 | 5/1975 | Kesting | 210/500.3 X |
| 3,957,935 | 5/1976 | Staude | 210/500.3 X |
| 4,080,743 | 3/1978 | Manos | 210/500.41 X |
| 4,134,742 | 1/1979 | Schell | 210/490 X |
| 4,428,776 | 1/1984 | Li | 55/158 X |
| 4,496,456 | 1/1985 | Hafez et al. | 264/41 X |
| 4,609,728 | 9/1986 | Spranger et al. | 264/41 X |
| 4,617,126 | 10/1986 | Funk et al. | 210/500.41 X |

FOREIGN PATENT DOCUMENTS 2946067 5/1981 Fed. Rep. of Germany .................. 210/500.38

Primary Examiner—Philip Anderson
Attorney, Agent, or Firm—Francis W. Lemon

[57] ABSTRACT

A cellulose acetate membrane is provided, capable of separating gaseous hydrogen from a gaseous mixture of hydrogen and hydrocarbon, by casting a 0.02 to 0.05 cm cellulose acetate film into an atmosphere at 20° to 40° C. and a relative humidity of 30 to 70%, from a casting solution at 0° to 20° C. and comprising 10 to 20 wt % cellulose acetate, 60 to 80 wt % acetone, 0.5 to 0.2 wt % magnesium perchlorate, balance water, then evaporating the solvent to form a membrane from the film, then gelling the membrane in ice cold water, then shrinking the membrane at 60° to 90° C. to produce a water wet membrane having an average pore radius less than 7 Å, then replacing the water in the membrane sequentially at the laboratory temperature (about 20° to 25° C.) first with aqueous alcohol (isopropyl plus water) and secondly with nonaqueous alcohol (isopropyl), then replacing the alcohol in the membrane with a nonaqueous, readily volatile organic solvent (hexane), and finally evaporating the nonaqueous solvent at laboratory temperature (about 20° to 25° C.) to produce a membrane having a pore radius in the range 1.5 to 5.0 Å and a standard deviation in the range 0.5 to 5.5 Å, according to the definition of Gaussian normal distribution.

7 Claims, No Drawings

METHOD OF MANUFACTURING A CELLULOSE ACETATE MEMBRANE AND THE MEMBRANE SO PRODUCED

This invention relates to a method of manufacturing a cellulose acetate membrane and the membrane so produced.

It has already been proposed in U.S. Pat. No. 3,842,515, dated Oct. 22, 1974, "Method for Drying Water-Wet Membranes", W. MacDonald and C. Y. Pan, to dry a water-wet, asymmetric, cellulose acetate membrane by (1) immersing it in water soluble alcohol (isopropyl alcohol) at 0° C. until the water is replaced thereby, (2) immersing the alcohol-wet membrane in an alcohol-soluble organic liquid (hexane) at 0° C., and then (3) drying the membrane quickly at ambient temperature without collapsing the walls of its pores.

While the membranes produced by the MacDonald and Pan process have been found to be useful for gaseous helium/gaseous methane separation there is still a need for a process where the contraction of the membrane during replacement of the isopropyl alcohol is less drastic, thus avoiding the likelihood of collapse of the walls of the pores and disintegration and which will produce a membrane having a good separation factor for separating gaseous hydrogen from a gaseous mixture of hydrogen and hydrocarbon and a high permeation rate of the product gas therefrom.

According to the present invention there is provided a method of manufacturing a cellulose acetate membrane, capable of separating gaseous hydrogen from a gaseous mixture of hydrogen and hydrocarbon, comprising:

(a) casting, in a casting atmosphere having a temperature in the range 20° to 40° C. and a relative humidity in the range 30 to 70%, a cellulose acetate film having a thickness in the range 0.02 to 0.05 cm, the film being cast from a casting solution at a temperature in the range 0° to 20° C., the casting solution comprising 10 to 20 wt % cellulose acetate, 60 to 80 wt % acetone, 0.5 to 2.0 wt % magnesium perchlorate, balance water, then (b) evaporating solvent from the cast solution for at least ten seconds, so that a membrane is formed having an asymmetric structure, then (c) gelling the cast membrane in ice cold water for at least one hour, then (d) shrinking the gelled membrane in water at a temperature in the range 60° to 90° C. to produce a water-wet, shrunk membrane having an average pore radius of less than 7 Å, then (e) replacing, at a temperature in the range about 20° to 25° C., the water in the membrane with aqueous organic alcohol which is substantially a non-solvent for the membrane, then (f) replacing, at a temperature in the range about 20° to 25° C., the aqueous organic alcohol in the membrane with a substantially nonaqueous organic alcohol which is readily miscible with a volatile hydrocarbon solvent, then (g) replacing, at a temperature in the range about 20° to 25° C., the substantially nonaqueous organic alcohol with the said volatile organic solvent, and then (h) evaporating the said volatile organic solvent to dry the membrane to a pore radius in the range 1.5 Å to 5.0 Å and a standard deviation in the range 0.5 Å to 5.5 Å according to the definition of Gaussian normal distribution.

Preferably the water in the membrane is replaced with aqueous organic alcohol in one step.

The aqueous organic alcohol solution may be an aqueous solution of at least one alcohol selected from the group consisting of isopropyl alcohol, tertiary butyl alcohol, ethylene glycol, diethylene glycol, triethylene glycol and ethylene glycol monoethyl ether.

The substantially nonaqueous organic alcohol, which is readily miscible with a volatile hydrocarbon solvent, may be at least one solvent selected from the group consisting of isopropyl alcohol, tertiary butyl alcohol, ethylene glycol, diethylene glycol, triethylene glycol and ethylene glycol monoethyl ether.

The said volatile organic solvent may be at least one solvent selected from the group consisting of pentane, hexane, cyclohexane, benzene, toluene, carbondisulfide, triethylamine and isopropyl ether.

According to another aspect of the present invention, there is provided a cellulose acetate membrane having a pore radius in the range 1.5 Å to 5.0 Å and a standard deviation in the range 0.5 Å to 1.0 Å according to the definition of Gaussian normal distribution.

In tests to verify the present invention, membranes were cast using a solution of the following composition (wt %): cellulose acetate 17, acetone 69.2, magnesium perchlorate 1.45 and water 12.35. All of the membranes were cast to equal nominal thickness. The casting solution and the casting atmosphere temperatures were kept constant at 10° and 30° C., respectively. The relative humidity of the casting atmosphere was maintained at 65%. Membranes were gelled in ice cold water after 60 seconds of solvent evaporation time and then shrunk in hot water at 80° C. These membranes were then dried, in order to use them for gas separation experiments by the multiple stage solvent exchange drying technique according to the present invention. In these tests the water in the membrane was replaced in a stage wise manner by a first water miscible solvent which was a nonsolvent for the membrane material, and the first solvent was replaced by a second volatile organic solvent within which the first solvent was readily soluble. Thus with reference to the tests, stage or stages refers to the number of stages used to replace the water in the membrane by the first solvent.

The second solvent was subsequently air evaporated to obtain the dry membrane. All the foregoing operations were conducted at the laboratory temperature (about 20° to 25° C.). A number of different solvents were used as the first solvent and as the second solvent. The first solvents used included isopropyl alcohol, tertiary butyl alcohol, ethylene glycol, diethylene glycol, triethylene glycol and ethylene glycol monoethyl ether. The solvents used as the second solvent included pentane, hexane, cyclohexane, benzene, toluene, carbondisulfide, triethylamine and isopropyl ether. The replacement of water in the membrane by the first solvent was done by successive immersion in first solvent-water solutions which were progressively more concentrated in the first solvent. For example, in four stage replacement, which was the most common in the tests, 25, 50, 75 and 100 vol. % aqueous solutions of the first solvent were used. When isopropyl alcohol was employed as the first solvent, the replacement was carried out also in one, two and three stages in order to study the effect of number of stages on the membrane performance. In the cases where the first solvent used was any one of the glycols, an intermediate solvent was also used, for membrane drying, between the first and the second solvents, as the glycols are not miscible with the second solvents. Intermediate solvents used were ethyl alcohol and n-butyl alcohol which are miscible with both the first solvents and the second solvents. Usage of different solvents in the drying procedure resulted in membranes of different average pore radii and pore radii distributions.

Membranes dried by the combination of different solvents in the tests are numbered in the following tables in the form of CA(K)-mn for the purpose of membrane identification, where CA indicates cellulose acetate material, K denotes the number of stages involved in the replacement of water in the membrane by the first solvent, and m and n are the numbers given to the first and to the second solvents, respectively, used in the membrane drying process. Numbers given to the first solvents are as follows: tertiary butyl alcohol-1, isopropyl alcohol-2, ethylene glycol monoethyl ether-3, ethylene glycol-4, diethylene glycol-5, triethylene glycol-6; whereas the second solvents were numbered as follows: pentane-1, hexane-2, cyclohexane-3, benzene-4, toluene-5, triethylamine-6, isopropyl ether-7 and carbondisulfide-8.

Air in reverse osmosis cells containing the membranes and in the feed gas line thereto was removed by flushing with a feed gas mixture of hydrogen and methane. The mole fraction of hydrogen in the feed gas was changed from 0.883 to 0.116. All the experiments were conducted at the laboratory temperature (about 20° to 25° C.) and the feed pressure was varied in the range of 400 to 2400 kPa abs. The permeate flow rate was measured by a bubble displacement method. The composition of the gas was measured by gas chromatography. The accuracy involved in gas composition analysis was ±1%.

Cellulose acetate membranes were dried by the solvent exchange technique using various combinations of first, second and intermediate solvents and they showed a wide variation in separation factors ranging from 1 to 28 for a feed mixture of hydrogen and methane. A wide variation in permeation rate was also found ranging from $1.25 \times 10^{-4}$ to $9.71 \times 10^{-7}$ kmol/m²s, for the feed containing 0.883 mole fraction of hydrogen at the operating pressure of about 2200 kPa abs. These wide variations in the separation factor and in the permeation rate emphasize the importance of the solvents and the number of stages used in the solvent exchange technique of membrane drying. The membranes dried by the combination of isopropyl alcohol and hexane as the first and the second solvent, respectively, usually gave higher separation factors and permeation rates compared to the membranes dried using other combinations of solvents. It was also found that when membranes were dried using the combination of isopropyl alcohol and hexane solvents, the number of stages involved in the replacement of water in the membrane by isopropyl alcohol significantly affected the membrane performance. It will be seen in the following Table I that the membrane (CA(2)-22) dried by a two stage process (replacing water with 50 vol. % aqueous solution of isopropyl alcohol which was then replaced by nonaqueous isopropyl alcohol) gave a higher separation factor as well as the permeation rate for hydrogen methane gas mixtures compared to the membranes dried by one (CA(1)-22), three (CA(3)-22) and four (CA(4)-22) stage processes. The highest separation factor obtained for the membrane CA(2)-22 was 28 at the operating pressure of 2225 kPa abs for a feed gas mixture containing 0.883 mole fraction of hydrogen. This result corresponds to the pure hydrogen permeation rate of 99 relative to pure methane permeation rate, which is significantly higher than the values reported for various known membranes. For instance, from the data disclosed in the patents and other documents, applicants were able to calculate the separation index of hydrogen/methane gas mixture (defined as the ratio of hydrogen permeability coefficient to that of methane permeability coefficient) and the hydrogen permeability coefficient to be 28 and $0.4 \times 10^{-4}$ cm³(STP)/cm².s.cm Hg, respectively, for a membrane produced according to U.S. Pat. No. 3,415,038. Similarly, applicants obtain the separation index of 45 to 55 for a membrane produced by U.S. Pat. No. 4,134,742. Other patents do not disclose any data enabling the calculation of the separation index and permeability coefficient for hydrogen/methane gas mixtures.

TABLE I

Effect of Number of Stages Involved in the Replacement of Water in the Membranes by the First Solvent on the Separation Factor and the Permeation Rate

| $X_{12}$ | Membrane | Pressure, kPa | $S_{12}$ | [PR], kmol/m² · s |
|---|---|---|---|---|
| 0.883 | CA(1)-22 | 487.4 | 9.3 | $0.144 \times 10^{-5}$ |
| | | 1411.3 | 4.3 | $0.261 \times 10^{-5}$ |
| | | 1756.1 | 4.2 | $0.296 \times 10^{-5}$ |
| | CA(2)-22 | 446.1 | 9.0 | $0.330 \times 10^{-5}$ |
| | | 652.9 | 15.0 | $0.340 \times 10^{-5}$ |
| | | 1135.5 | 21.0 | $0.700 \times 10^{-5}$ |
| | | 1494.1 | 25.0 | $0.960 \times 10^{-5}$ |
| | | 2224.9 | 28.0 | $0.150 \times 10^{-4}$ |
| | CA(3)-22 | 487.4 | 6.1 | $0.254 \times 10^{-6}$ |
| | | 914.9 | 7.0 | $0.497 \times 10^{-6}$ |
| | | 1411.3 | 8.6 | $0.793 \times 10^{-6}$ |
| | | 1756.1 | 13.3 | $0.990 \times 10^{-6}$ |
| | | 2169.7 | 19.1 | $0.606 \times 10^{-5}$ |
| | CA(4)-22 | 515.0 | 9.4 | — |
| | | 1410.0 | 14.5 | — |
| | | 2310.0 | 17.5 | $0.947 \times 10^{-6}$ |
| 0.781 | CA(1)-22 | 452.9 | 6.8 | $0.104 \times 10^{-5}$ |
| | | 1349.3 | 2.2 | $0.172 \times 10^{-5}$ |
| | | 1756.1 | 1.6 | $0.205 \times 10^{-5}$ |
| | CA(2)-22 | 446.1 | 15.0 | $0.170 \times 10^{-5}$ |
| | | 790.8 | 20.0 | $0.360 \times 10^{-5}$ |
| | | 1101.1 | 21.0 | $0.530 \times 10^{-5}$ |
| | | 1549.2 | 18.5 | $0.780 \times 10^{-5}$ |
| | | 2204.2 | 17.0 | $0.120 \times 10^{-4}$ |
| | CA(3)-22 | 452.9 | 13.0 | $0.225 \times 10^{-6}$ |
| | | 859.7 | 11.0 | $0.411 \times 10^{-6}$ |
| | | 1756.1 | 7.2 | $0.832 \times 10^{-6}$ |
| | CA(4)-22 | 515.0 | 7.3 | — |
| | | 1410.0 | 10.0 | $0.110 \times 10^{-6}$ |
| | | 2310.0 | 12.7 | $0.120 \times 10^{-6}$ |

In the tests given above, the first solvent used was isopropyl alcohol and the second solvent used was hexane.

The separation factor, $S_{12}$, is defined as:

$$S_{12} = \frac{X_{13}/X_{23}}{X_{12}/X_{22}}$$

where $X_{13}$ and $X_{23}$ are mole fractions of hydrogen and methane in the permeate gas, respectively, and $X_{12}$ and $X_{22}$ are those in the feed gas.

The product permeation rate [PR] is defined as the total mole of gas permeation per unit area of membrane (m²) in unit time (s).

The tests revealed that a membrane with a lower permeation rate does not necessarily yield a higher separation factor and vice versa. The permeation rates and the separation factors obtained in the present study for some of the membranes dried using different combinations of solvents are presented in the following Table II. It may be seen in Tables I and II that the permeation rates and the separation factors obtained at all feed compositions and at all feed gas pressures were lower for the membrane dried using tertiary butyl alcohol as the first solvent and benzene as the second solvent (CA(4)-14) than those for the membrane dried using isopropyl alcohol as the first solvent and hexane as the second solvent (CA(2)-22) at corresponding feed compositions and feed gas pressures.

TABLE II

Some Experimental Data on Permeation Rate and Separation Factor for Different Membranes at Various Pressures and Feed Compositions

| $X_{12}$ | Membrane | Pressure, kPa | $S_{12}$ | [PR], kmol/m² · s |
|---|---|---|---|---|
| 0.883 | CA(4)-14 | 790.8 | 1.9 | $0.19 \times 10^{-6}$ |
| | | 1114.8 | 1.74 | $0.33 \times 10^{-6}$ |
| | | 1818.1 | 1.7 | $0.72 \times 10^{-6}$ |
| | | 2176.6 | 1.7 | $0.97 \times 10^{-6}$ |
| 0.781 | CA(4)-14 | 1342.4 | 1.8 | $0.39 \times 10^{-6}$ |
| | | 1825.0 | 1.8 | $0.63 \times 10^{-6}$ |
| | | 2169.7 | 1.84 | $0.84 \times 10^{-6}$ |
| 0.484 | CA(4)-14 | 859.7 | 1.8 | $0.13 \times 10^{-6}$ |
| | | 1342.4 | 1.8 | $0.24 \times 10^{-6}$ |
| | | 1804.3 | 2.0 | $0.38 \times 10^{-6}$ |
| | | 2204.2 | 1.9 | $0.52 \times 10^{-6}$ |
| 0.238 | CA(4)-14 | 446.1 | 2.0 | $0.35 \times 10^{-7}$ |
| | | 1342.4 | 2.0 | $0.13 \times 10^{-6}$ |
| | | 1790.5 | 1.9 | $0.24 \times 10^{-6}$ |
| | | 2204.2 | 1.8 | $0.34 \times 10^{-6}$ |
| | CA(2)-22 | 446.1 | 11.0 | $0.18 \times 10^{-6}$ |
| | | 790.8 | 10.5 | $0.33 \times 10^{-6}$ |
| | | 1135.5 | 10.2 | $0.51 \times 10^{-6}$ |
| | | 1549.2 | 10.0 | $0.78 \times 10^{-6}$ |

All the membranes formed in the present investigation were characterized in terms of $\overline{R}$, $\sigma$, $A_1$ and $A_2$ by using the transport equation described in Rangarajan et al. Ind.Eng.Chem.Process Des.Dev.1984, 23, 79–87., together with the permeability data of helium through the membranes. The results are shown in the following Table III. The table shows that there are over 8 fold variation in $(\overline{R})_{He}$ and 11 fold variation in $\sigma$. Furthermore, there are 380 fold variation in the value of $A_1$ and 500 fold variation in $(A_2)_{He}$. These variations indicate that the membranes tested have a wide range of porosity and surface characteristic ($A_2$), which should result in a wide variation in permeation rates and separation factors of a gas mixture. The parameters $\overline{R}$ and $\sigma$ indicate the average pore radius and the standard deviation respectively, whereas $A_1$ and $A_2$ are constant characteristics of the particular membrane, gas mixture system.

TABLE III

Membrane Characterization by Using Helium Permeation Data

| Membrane | $(\overline{R})_{He} \times 10^{10}$, m | $\sigma \times 10^{10}$, m | $(A_1)_{He}$, m$^{-3}$ | $(A_2)_{He}$, kmol/m³sPa² |
|---|---|---|---|---|
| CA(4)-11 | 8.0 | 4.3 | $6.24 \times 10^{19}$ | $5.15 \times 10^{-8}$ |
| CA(4)-12 | 8.0 | 5.5 | $6.45 \times 10^{18}$ | $1.46 \times 10^{-9}$ |
| CA(4)-13 | 12.0 | 3.3 | $1.01 \times 10^{19}$ | $4.38 \times 10^{-9}$ |
| CA(4)-14 | 4.0 | 1.7 | $3.40 \times 10^{17}$ | $1.02 \times 10^{-10}$ |
| CA(4)-15 | 7.0 | 0.8 | $3.15 \times 10^{17}$ | $3.15 \times 10^{-10}$ |
| CA(4)-16 | 4.0 | 2.7 | $5.63 \times 10^{18}$ | $1.24 \times 10^{-9}$ |
| CA(4)-17 | 24.0 | 0.7 | $1.64 \times 10^{17}$ | $5.55 \times 10^{-10}$ |
| CA(4)-18 | 7.0 | 0.9 | $9.21 \times 10^{17}$ | $6.26 \times 10^{-10}$ |
| CA(4)-21 | 26.0 | 0.5 | $1.85 \times 10^{17}$ | $4.18 \times 10^{-10}$ |
| CA(1)-22 | 7.0 | 1.1 | $1.36 \times 10^{18}$ | $9.83 \times 10^{-10}$ |
| CA(2)-22 | 4.6 | 0.5 | $2.47 \times 10^{18}$ | $1.30 \times 10^{-9}$ |
| CA(3)-22 | 6.4 | 1.3 | $2.25 \times 10^{17}$ | $1.18 \times 10^{-10}$ |
| CA(4)-22 | 3.2 | 2.3 | $4.24 \times 10^{17}$ | $1.15 \times 10^{-9}$ |
| CA(4)-24 | 5.0 | 1.0 | $7.87 \times 10^{17}$ | $1.53 \times 10^{-10}$ |
| CA(4)-25 | 7.0 | 0.7 | $6.99 \times 10^{17}$ | $5.83 \times 10^{-10}$ |
| CA(4)-27 | 5.0 | 1.1 | $6.79 \times 10^{18}$ | $2.26 \times 10^{-9}$ |
| CA(4)-28 | 24.0 | 0.7 | $5.37 \times 10^{17}$ | $2.53 \times 10^{-10}$ |
| CA(4)-32 | 7.0 | 0.9 | $1.22 \times 10^{19}$ | $7.07 \times 10^{-9}$ |
| CA(4)-42[a] | 5.8 | 0.6 | $6.15 \times 10^{17}$ | $1.68 \times 10^{-9}$ |
| CA(4)-47[a] | 5.0 | 3.0 | $3.15 \times 10^{19}$ | $8.01 \times 10^{-9}$ |
| CA(4)-52[b] | 5.0 | 1.5 | $6.31 \times 10^{19}$ | $1.99 \times 10^{-8}$ |
| CA(4)-62[c] | 24.0 | 0.7 | $2.15 \times 10^{18}$ | $1.59 \times 10^{-9}$ |

[a] ethylene glycol followed by ethyl alcohol
[b] diethylene glycol followed by n-butyl alcohol
[c] triethylene glycol followed by n-butyl alcohol The table shows that CA(2)-22 membrane which indicated the highest separation factor and relatively high permeation rate, possesses the pore size distribution with $\overline{R}=4.6$ and $\sigma=0.5$ which is in the range achieved by the process according to the present invention with respect to the pore radius distribution.

Further tests have been carried out, using membranes cast with the same casting solutions and with the same casting conditions as those used in the previous tests, but for separating carbon dioxide from gaseous mixtures of carbon dioxide and hydrocarbon (methane).

The results of the further tests are given in the following Table IV.

TABLE IV

Performance Data of Some Cellulose Acetate Membranes for the Separation of $CO_2$—Methane Gas Mixtures

| Film No. | Shrinkage Temperature °C. | Solvent | Number of stages for water removal | Average pore radius, Å | $\sigma$, Å | Separation Index | Separation[a] factor | Product gas[a] permeation rate, kmol/m² · s |
|---|---|---|---|---|---|---|---|---|
| 1 | 60 | isopropyl alcohol CS$_2$ | 4 | 6.0 | 5.5 | 1.5 | 1.8 | $6.64 \times 10^{-6}$ |
| 2 | 70 | isopropyl alcohol CS$_2$ | 4 | 5.5 | 4.0 | 10 | 8.7 | $5.59 \times 10^{-6}$ |
| 3 | 75 | isopropyl alcohol CS$_2$ | 4 | 7.0 | 2.0 | 37.5 | 14.9 | $1.39 \times 10^{-6}$ |
| 4 | 80 | isopropyl alcohol CS$_2$ | 2 | 5.3 | 3.2 | 45.7 | 18.2 | $3.02 \times 10^{-6}$ |
| 5 | 80 | isopropyl alcohol CS$_2$ | 4 | 4.5 | 4.5 | 256 | 28 | $1.17 \times 10^{-5}$ |
| 6 | 80 | isopropyl alcohol CS$_2$ | 5 | 6.2 | 2.6 | 53 | 21.1 | $2.62 \times 10^{-6}$ |
| 7 | 80 | isopropyl alcohol | 4 | 6.5 | 2.0 | 35 | 14.0 | $7.83 \times 10^{-6}$ |

TABLE IV-continued

Performance Data of Some Cellulose Acetate Membranes for the Separation of CO$_2$—Methane Gas Mixtures

| Film No. | Shrinkage Temperature °C. | Solvent | Number of stages for water removal | Average pore radius, Å | σ, Å | Separation Index | Separation[a] factor | Product gas[a] permeation rate, kmol/m$^2$·s |
|---|---|---|---|---|---|---|---|---|
| 8 | 85 | hexane isopropyl alcohol CS$_2$ | 4 | 3.5 | 3.0 | — | — | — |

[a]CO$_2$ mole fraction in feed gas, 0.9; operating 2100 kPa gauge (306 psig)

$$\text{Separation factor is defined as, } \frac{\left(\frac{\text{mole fraction of CO}_2}{\text{mole fraction of CH}_4}\right) \text{ in the product gas}}{\left(\frac{\text{mole fraction of CO}_2}{\text{mole fraction of CH}_4}\right) \text{ in the feed gas}}$$

While any number of stages can be used for the replacement of water in water-wet membranes with non-aqueous isopropyl alcohol, as will be seen from Table IV, four stage replacement (25, 50, 75 and 100 vol. % aqueous solutions) of the aqueous organic alcohol is preferable. For example, the data from from Film No. 4–6 in Table IV indicates that all membranes produced by 2, 4 and 5 stages replacement (of water) were given sufficiently high separation indices while satisfying the proposed requirement for the pore size distribution. But the result from Film No. 5 produced by 4 stages replacement was by far the best.

The combination of organic solvents used in the solvent exchange is another important governing factor. As the data from Films No. 5 and No. 7 in Table IV shows, the separation index of the former membrane produced by the combination of isopropyl alcohol-carbon disulfide (256) was much better than that of the latter membrane produced by the combination of isopropyl alcohol-hexane (35).

The shrinkage temperature applied in the process of manufacturing water-wet membranes was also an important factor, since it was found to govern the average pore size and the pore size distribution on the surface of the water-wet membrane. The data for Films Nos. 1–6 and 8 in Table IV shows that only shrinkage temperatures of 75° C. and 80° C. bring the average pore size and the pore size distribution on the surface of dry cellulose acetate membrane into the range required for achieving high separation indices. Among the higher shrinkage temperatures, 80° C. is better than 75° C. Though the average pore radius could be reduced to 3.5 Å at the shrinkage temperature of 85° C. which size must be even more favourable for obtaining a high separation index, the permeability of the membrane to CO$_2$ and methane gases was found to be too low to determine the separation index. It is also shown in Table IV that the number of pores on the membrane surface was the largest and consequently the product gas flux was the highest with respect to Film No. 5. Further, the separation index obtained from the latter membrane was 256 which value was far greater than that between 20 and 30 achieved by the conventional method of drying cellulose acetate membranes.

These tests show that for carbon dioxide removal from hydrocarbon gases the cellulose acetate membrane preferably has a pore radius in the range 4.0 Å to 5.0 Å and a standard deviation in the range 0.5 Å to 5.5 Å.

We claim:

1. A cellulose acetate membrane having a pore radius in the range 1.5 Å to 5.0 Å and a standard deviation in the range 0.5 Å to 5.5 Å according to the definition of Gaussian normal distribution.

2. A cellulose acetate membrane according to claim 1, having a pore radius in the range 4.0 Å to 5.0 Å and a standard deviation in the range 0.5 Å to 5.5 Å.

3. A method of manufacturing a cellulose acetate membrane, capable of separating gaseous hydrogen from a gaseous mixture of hydrogen and hydrocarbon, comprising:
   (a) casting, in a casting atmosphere having a temperature in the range 20° to 40° C. and a humidity in the range 30 to 70%, a cellulose acetate film having a thickness in the range 0.02 to 0.05 cm, the film being cast from a casting solution at a temperature in the range 0° to 20° C., the casting solution comprising 10 to 20 wt % cellulose acetate, 60 to 80 wt % acetone, 0.5 to 2.0 wt % magnesium perchlorate, balance water, then
   (b) evaporating solvent from the cast solution for at least ten seconds so that a membrane is formed having an assymmetric structure, then
   (c) gelling the cast membrane in ice cold water for at least one hour, then
   (d) shrinking the gelled membrane in water at a temperature in the range 60° to 90° C. to produce a water wet, shrunk membrane having an average pore radius of less than 7 Å, then
   (e) replacing, at a temperature in the range about 20° to 25° C., the water in the membrane with aqueous organic alcohol which is substantially a non-solvent for the membrane, then
   (f) replacing, at a temperature in the range about 20° to 25° C., the aqueous organic alcohol in the membrane with substantially nonaqueous organic alcohol which is readily miscible with a volatile organic solvent, then
   (g) replacing, at a temperature in the range about 20° to 25° C., the substantially nonaqueous organic alcohol with the said volatile organic solvent, and then
   (h) evaporating the said volatile organic solvent to dry the membrane to a pore radius in the range 1.5 Å to 5.0 Å and a standard deviation in the range 0.5 Å to 5.5 Å according to the definition of Gaussian normal distribution.

4. A method according to claim 1, wherein the aqueous organic alcohol is an aqueous solution of at least one alcohol selected from the group consisting of isopropyl alcohol, tertiary butyl alcohol, ethylene glycol, diethylene glycol, triethylene glycol and ethylene glycol monoethyl ether.

5. A method according to claim 3, wherein the substantially nonaqueous organic alcohol, which is readily miscible with a volatile organic solvent, is at least one solvent selected from the group consisting of isopropyl alcohol, tertiary butyl alcohol, ethylene glycol, diethylene glycol, triethylene glycol and ethylene glycol monoethyl ether.

6. A method according to claim 1, wherein the said volatile organic solvent is at least one solvent selected from the group consisting of pentane, hexane, cyclohexane, benzene, toluene, carbondisulfide, triethylamine and isopropyl ether.

7. A method according to claim 3, wherein the aqueous organic alcohol is isopropyl alcohol and the volatile organic solvent is carbon disulfide.

* * * * *